(12) United States Patent
Heibel (10) Patent No.: US 11,977,193 B2
(45) Date of Patent: May 7, 2024

(54) WIRELESS POWER LEVEL AND POWER DISTRIBUTION MONITORING AND CONTROL SYSTEM FOR SUBCRITICAL SPENT FUEL ASSEMBLY ARRAY USING REMOVABLE SIC NEUTRON DETECTOR THIMBLE TUBE

(71) Applicant: Westinghouse Electric Company LLC, Cranberry Township, PA (US)

(72) Inventor: Michael D. Heibel, Broomfield, CO (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/813,156

(22) Filed: Jul. 18, 2022

(65) Prior Publication Data

US 2024/0019594 A1    Jan. 18, 2024

(51) Int. Cl.
   *G21C 17/06*    (2006.01)
   *G01T 3/00*     (2006.01)
   *G01T 3/08*     (2006.01)
   *G21C 19/40*    (2006.01)

(52) U.S. Cl.
   CPC ............. *G01T 3/006* (2013.01); *G01T 3/08* (2013.01); *G21C 17/06* (2013.01); *G21C 19/40* (2013.01)

(58) Field of Classification Search
   CPC ........... G01T 3/006; G01T 3/08; G21C 17/06; G21C 19/40
   See application file for complete search history.

(56) References Cited

U.S. PATENT DOCUMENTS

| | | | |
|---|---|---|---|
| 6,252,923 B1 * | 6/2001 | Iacovino | G21F 5/06 |
| | | | 250/370.06 |
| 2011/0002432 A1 * | 1/2011 | Heibel | G21D 3/001 |
| | | | 376/254 |
| 2013/0083879 A1 * | 4/2013 | Heibel | G21C 17/10 |
| | | | 376/153 |
| 2017/0140842 A1 * | 5/2017 | Heibel | G21C 9/02 |
| 2020/0402680 A1 * | 12/2020 | Carvajal | G08C 19/16 |

* cited by examiner

*Primary Examiner* — Mark R Gaworecki
(74) *Attorney, Agent, or Firm* — K&L Gates LLP (57) ABSTRACT

A power sensor system for monitoring a subcritical neutron generator is provided. The power sensor system comprises a self-powered sensor insert. The self-powered sensor insert comprises an insert thimble and a detector assembly. The insert thimble includes an outer housing, a power generator configured to produce an electrical power based on an incident radiation and a first electrical interface electrically connected to the power generator. The detector assembly includes a solid state radiation detector able to provide a detector signal directly proportional to a neutron flux level, a transmitter configured to wirelessly output a transmitter signal based on the detector signal and a second electrical interface configured to electrically couple to the first electrical interface. A power monitor system comprising a power sensor system and a control system and a method for optimizing a subcritical neutron generator are also provided.

14 Claims, 8 Drawing Sheets

WIRELESS POWER LEVEL AND POWER DISTRIBUTION MONITORING AND CONTROL SYSTEM FOR SUBCRITICAL SPENT FUEL ASSEMBLY ARRAY USING REMOVABLE SIC NEUTRON DETECTOR THIMBLE TUBE

BACKGROUND

An accurate and continuous monitoring of the neutron flux levels inside the fuel assemblies contained within a spent fuel array of a subcritical neutron generator is required to avoid exceeding the maximum neutron flux and $K_{\mathit{eff}}$ conditions inside and around the spent fuel array. The relatively low neutron flux values in the spent fuel array make it difficult to use currently available neutron radiation measurement devices and techniques employed in typical commercial power and research reactor settings. Additionally, the need to continuously and accurately monitor the neutron fluxes in a subcritical neutron generator significantly limits the space available to implement a neutron radiation measurement device. A need exists to develop monitoring systems and methods to optimize the neutron flux in a subcritical neutron generator without compromising safe operating conditions.

SUMMARY

The following summary is provided to facilitate an understanding of some of the innovative features unique to the aspects disclosed herein, and is not intended to be a full description. A full appreciation of the various aspects disclosed herein can be gained by taking the entire specification, claims, and abstract as a whole.

In various aspects, a power sensor system for monitoring a subcritical neutron generator is disclosed. In some aspects, the power sensor system includes a self-powered sensor insert for measuring neutron flux levels in a spent fuel assembly of the subcritical neutron generator. In some aspects, the self-powered sensor insert includes an insert thimble and a detector assembly. In some aspects, the insert thimble includes an outer housing comprising a closed end; a hollow tube positioned within the outer housing; a power generator positioned between the hollow tube and the outer housing; and a first electrical interface electrically connected to the power generator. In certain aspects, the outer housing is insertable into a guide thimble of a spent fuel assembly. In certain aspects, the power generator includes an electron emitter and an electron collector, wherein the electron emitter comprises a first material and a second material, wherein the electron emitter is configured to be responsive to an incident radiation produced by the spent fuel assembly, and wherein the power generator is configured to produce an electrical power based on the incident radiation. In some aspects, the detector assembly includes a detector tube sized to fit into the hollow tube of the insert thimble, the detector tube comprising a solid state radiation detector, wherein the radiation detector provides a detector signal directly proportional to a neutron flux level; a transmitter section comprising a transmission circuit, wherein the transmitter section is configured to wirelessly output a transmitter signal based on the detector signal; and a second electrical interface configured to electrically couple to the first electrical interface, wherein the second electrical interface is electrically connected to the transmission circuit.

In various aspects, a power monitor system for controlling a subcritical neutron generator is disclosed. In some aspects, the power monitor system includes a power sensor system for monitoring a subcritical neutron generator and a control system. In some aspects, the power sensor system includes a self-powered sensor insert for measuring neutron flux levels in a spent fuel assembly of the subcritical neutron generator. In some aspects, the self-powered sensor insert includes an insert thimble and a detector assembly. In certain aspects, the insert thimble includes a housing; a first power generator for producing a first electrical power based on delta-radiation, wherein the first power generator comprises a material having a high neutron capture cross section; and a first electrical interface configured to output the first electrical power. In certain aspects, the detector assembly includes a detector tube configured to be surrounded by the first power generator; at least one radiation detector comprising a Silicon Carbide based Schottky diode, wherein the at least one radiation detector is enclosed in the detector tube, wherein the at least one radiation detector is adapted to provide a first signal in response to an incident neutron flux; a transmission circuit comprising a transmitter for outputting a wireless signal based on the first signal; and a second electrical interface, wherein the second electrical interface is adapted to receive the first electrical power, and wherein the second electrical interface provides a power source for the transmission circuit. In some aspects, the control system includes an antenna for receiving the wireless signal; a signal interface, wherein an input of the signal interface is electrically connected to the antenna, wherein the signal interface is configured to output a third signal based on the wireless signal; and a controller comprising a processor. In certain aspects, the processor is configured to receive the third signal and based on the third signal, control a neutron flux outputted by an electronic neutron generator of the subcritical neutron generator.

In various aspects, a method for optimizing a subcritical neutron generator is disclosed. In some aspects, the method includes preparing the subcritical neutron generator and loading the subcritical neutron generator. In certain aspects, preparing the subcritical neutron generator includes opening a top of a containment vessel of the subcritical neutron generator; and inserting a self-powered sensor insert of a power monitor system into at least one spent fuel assembly. In certain aspects, loading the subcritical neutron generator includes individually inserting the at least one spent fuel assembly into the open top of the containment vessel; continuously monitoring a signal produced by the self-powered sensor insert to evaluate a neutron reproduction factor within the open containment vessel during the loading; and replacing the top of the containment vessel after loading the last at least one spent fuel assembly.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

The various aspects described herein, together with objects and advantages thereof, may best be understood by reference to the following description, taken in conjunction with the accompanying drawings as follows.

Corresponding reference characters indicate corresponding parts throughout the several views. The exemplifications set out herein illustrate various aspects of the present disclosure, in one form, and such exemplifications are not to be construed as limiting the scope of any of the aspects disclosed herein.

DETAILED DESCRIPTION

Certain exemplary aspects of the present disclosure will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

In the following description, like reference characters designate like or corresponding parts throughout the several views of the drawings. Also in the following description, it is to be understood that such terms as "forward," "rearward," "left," "right," "above," "below," "upwardly," "downwardly," and the like are words of convenience and are not to be construed as limiting terms.

Synthetic radioisotopes are typically produced by enriching a parent isotope in a neutron rich environment, such as, for example, within a fuel assembly of an operating nuclear reactor or within a subcritical neutron generator. In the context of operating nuclear reactors, fissile fuel in the fuel assemblies undergo fission, thereby producing fission products including fast neutrons. In an operating power reactor, these fission products subsequently initiate a self-sustaining chain reaction or a critical reactor state. When the fissile fuel contained in a nuclear fuel assembly is exhausted, or otherwise spent, the spent fuel assembly is no longer able to sustain the critical reactor state and thus, no longer useful for commercial thermal power production. However, spent fuel assemblies contain radioisotopes which continue to emit ionizing radiation, such as, for example, gamma radiation.

Figure 1:
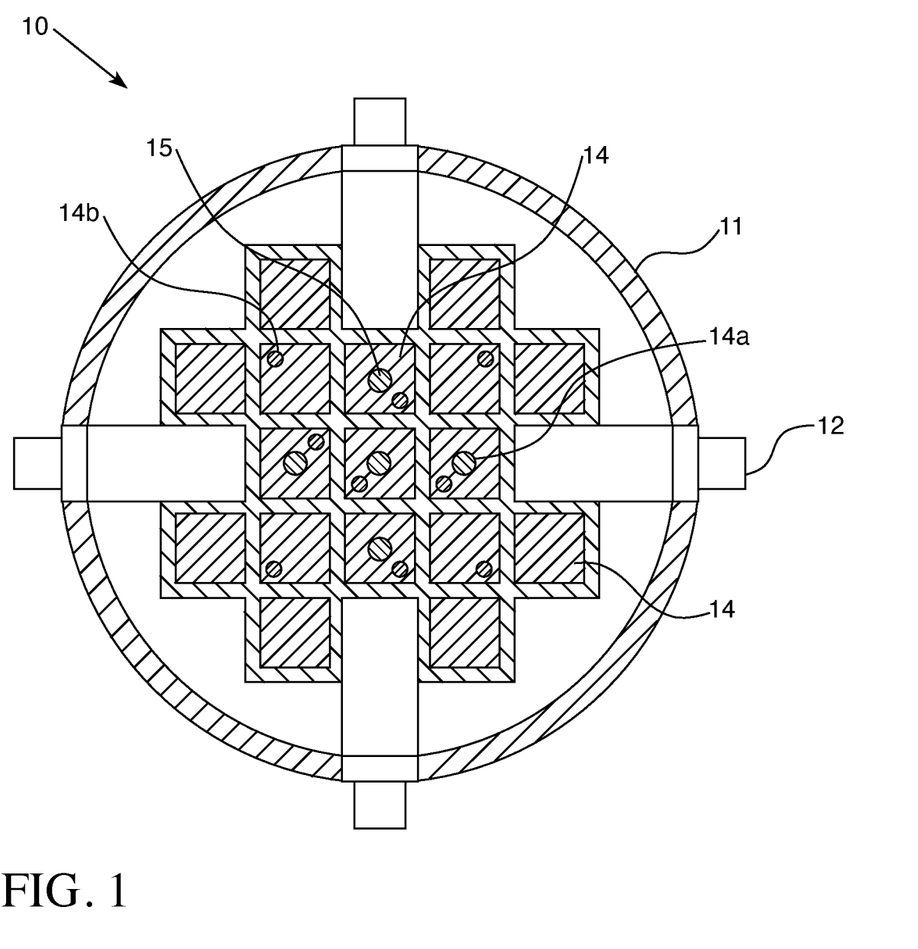
FIG. 1 is a cross-sectional schematic representation of a subcritical neutron generator, in accordance with at least one non-limiting aspect of the present disclosure.

A sufficient neutron flux is required to produce the desired radioisotope in an irradiation target containing the parent isotope. An electronic neutron generator (hereinafter referred to as "ENG") can produce a modest neutron flux and is inherently safer to operate than a commercial nuclear reactor, but ENGs are not able to provide a neutron flux sufficient for producing synthetic radioisotope on a commercial scale. However, the neutron flux produced by an ENG can be used to induce a subcritical fission of spent fuel, thereby producing gamma radiation and a subcritical neutron flux sufficient for commercial radioisotope production. For example, FIG. 1 depicts a cross-sectional schematic representation of a subcritical neutron generator 10, in accordance with at least one non-limiting aspect of the present disclosure. A subcritical neutron generator 10 can include a containment vessel 11 with an opening coverable by a removable cover or lid, an array of ENGs 12, and a removable subcritical array of spent fuel assemblies 14. A subcritical neutron generator directs a neutron flux from the ENGs to the spent fuel assemblies to generate many more neutrons than an ENG alone, and therefore is able to produce a neutron flux sufficient for commercially producing synthetic radioisotopes. Additionally, the subcritical neutron generator 10 can be easily reloaded with a new array of spent fuel assemblies through the opening of the containment vessel 11 by removing the cover/lid, for example. Thus, a subcritical neutron generator can be used to irradiate parent isotopes without requiring an operating nuclear reactor or the complicated operating procedure thereof. Additional details and uses related to subcritical neutron generators are described in U.S. patent application Ser. No. 17/807,067 entitled "USE OF SUB-CRITICAL NEUTRON MULTIPLICATION DRIVEN BY ELECTRONIC NEUTRON GENERATORS TO PRODUCE RADIOISOTOPES" filed on Jun. 15, 2022, which is owned by the Applicant of the present application, and which is incorporated by reference herein in its entirety.

As discussed above, subcritical neutron generators can provide a significantly higher neutron flux than an ENG. However, the neutron flux delivered by the ENG to a spent fuel assembly containing a parent isotope can require considerations specific to each fuel assembly. For example, a distribution and/or level of fission activity in an irradiated fuel assembly can be dependent on the level of source neutron flux provided by an ENG array and/or the positioning of the ENG array with respect to the spent fuel assembly. Additionally, in the unexpected event where the neutron reproduction factor $K_{eff}$ in a spent fuel assembly array increases beyond the predicted value, the heat produced within the subcritical neutron generator can unexpectedly surpass a maximum allowed value in a short amount of time, thereby requiring an emergency coolant injection response and/or ENG shutdown. Thus, a method for operating a subcritical neutron generator may be optimized with, or otherwise benefit from, a continuous source of information regarding fission level and/or neutron flux distribution present inside the subcritical neutron generator.

In the context of power nuclear reactors, a bottom accessible instrumentation thimble at the center of a fuel assembly can be accessed via a penetration in the reactor vessel bottom. Incore detectors are typically inserted into the fuel assembly with a drive mechanism through the bottom penetration and axially positioned along the bottom accessible thimble to provide fission level information at various axial positions along the reactor core. However, these standard detection methods and devices are generally difficult to implement in a subcritical neutron generator 10 and cannot provide a continuous and/or accurate measurement therein. For example, an incore detector for detecting radiation in an operating power reactor may not be able to provide a prompt and/or accurate measurement of the comparatively lower neutron flux and/or fission levels typically present in subcritical neutron generators. Additionally, the bottom accessible thimble 14a of a spent fuel assembly 14 in a subcritical neutron generator 10 is typically reserved for an irradiation target insert 15, as shown in FIG. 1. Although a top accessible guide thimble 14b may be vacant, the associated penetration required for a drive mechanism for placing a movable detector insert into the guide thimble 14b would require much more space than a subcritical neutron generator 10 provides, compromise the removability of the lid for the containment vessel 11, and/or require a replacement of the lid onto the containment vessel to perform a measurement, thereby compromising the benefits of safety and simplified operation provided by a subcritical neutron generator. Additionally, the extra time required to remove and replace the removable lid would significantly decrease process efficiency during an initial loading step, thereby compromising any economic advantages of using a subcritical neutron generator. Accordingly, various aspects of the present disclosure provide various methods and devices for monitoring and/or controlling a neutron population in a subcritical neutron generator without sacrificing measurement accuracy, operating safety or process efficiency.

Figure 2:
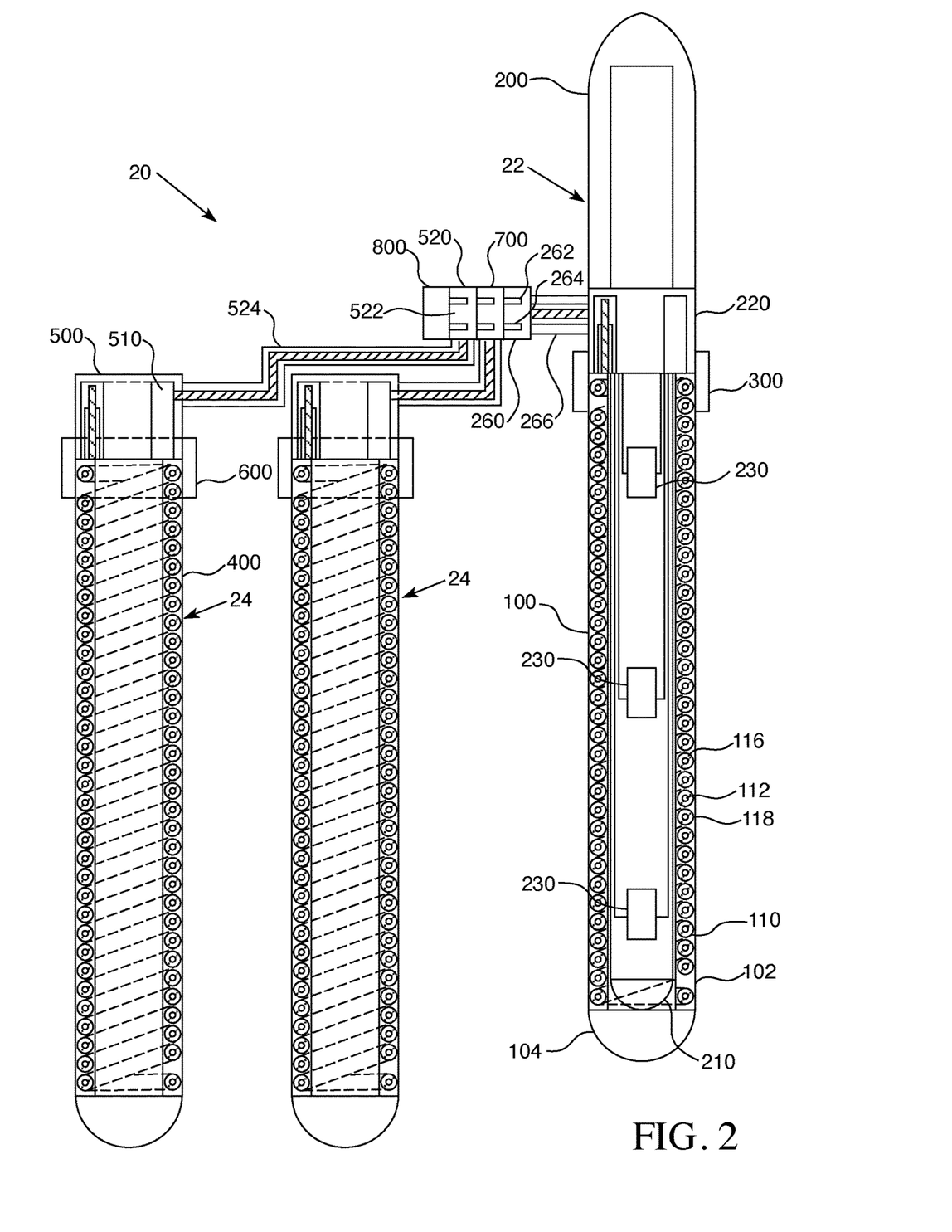
FIG. 2 is a cross-sectional schematic representation schematic representation of a power sensor system, in accordance with at least one non-limiting aspect of the present disclosure.

Now referring to FIG. 2, a cross-sectional schematic representation of a power sensor system 20 for monitoring a neutron flux is provided, according to at least one non-limiting aspect of the present disclosure. In various examples, the power sensor system 20 includes a self-powered sensor insert 22 for measuring neutron flux levels in a subcritical neutron generator. In some examples, the power sensor system 20 can optionally include an auxiliary power system 24.

Figure 3:
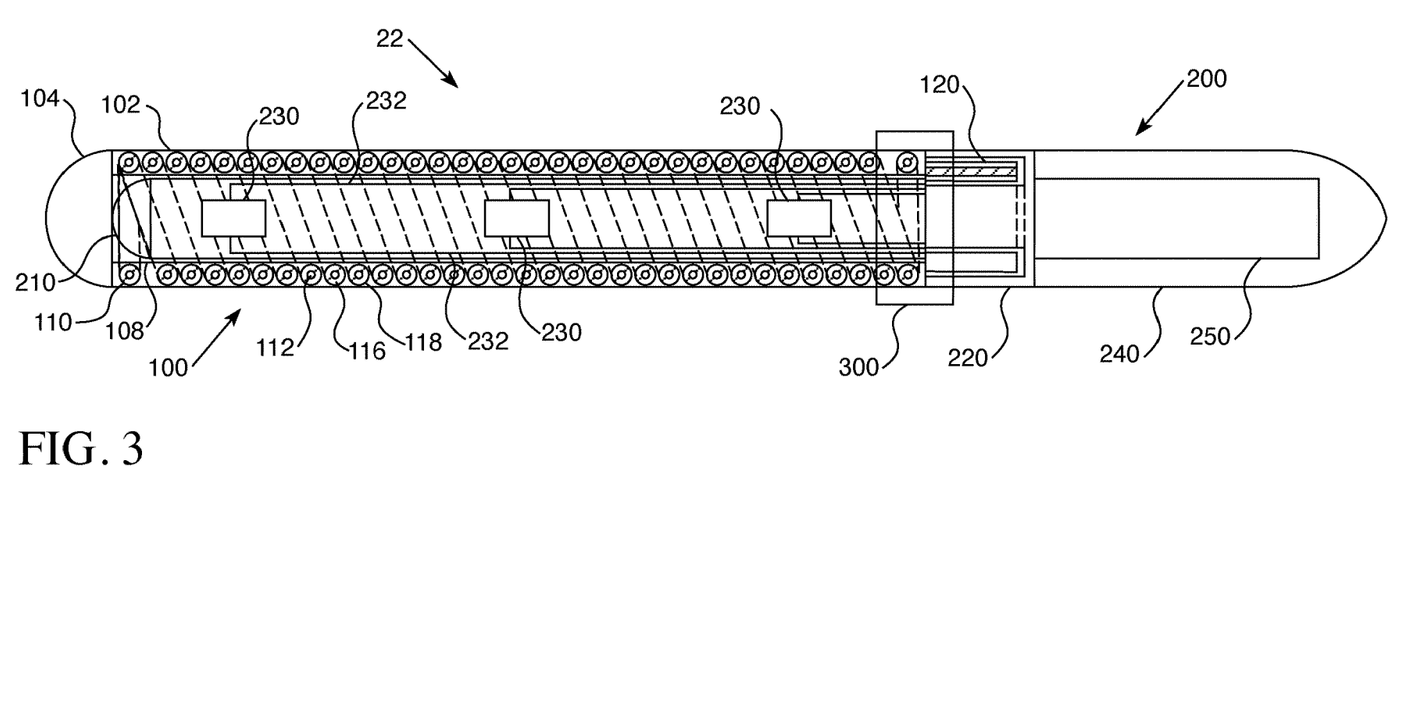
FIG. 3 is a schematic representation of an axial cross section of an exemplary self-powered sensor insert, in accordance with at least one non-limiting aspect of the present disclosure.

FIG. 3 depicts a cross-sectional schematic representation of a self-powered sensor insert 22, in accordance with at least one non-limiting aspect of the present disclosure. In various examples, the self-powered sensor insert 22 includes an insert thimble 100 and a detector assembly 200. The self-powered sensor insert 22 can optionally include a coupler 300 axially positioned around the mating interface between the insert thimble 100 and the detector assembly 200. In one example, the coupler 300 includes a one piece collar and at least one deformable O-ring seal positioned coaxially within the collar. In the collar configuration of the coupler 300, the size of the collar and/or O-ring can be configured to provide a liquid tight seal and/or a coupling force between the mating interface of the insert thimble 100 and the detector assembly 200. For example, the inner diameter of the collar can be configured with an inner diameter slightly larger than an outer cross-section geometry of the insert thimble 100 and/or the detector assembly 200 while the at least one deformable O-ring seal can be configured with an outer diameter substantially the same as, or slightly larger than, the inner diameter of the collar and an inner diameter slightly smaller than the outer cross-section geometry of the insert thimble 100 and/or the detector assembly 200 when nested inside an inner diameter of the collar. Other configurations are contemplated by the present disclosure. For example, in some implementations, the coupler 300 can be configured as a clamped coupler, a hinged coupler, a press fit coupler, or a set screw fastened coupler.

Figure 4:
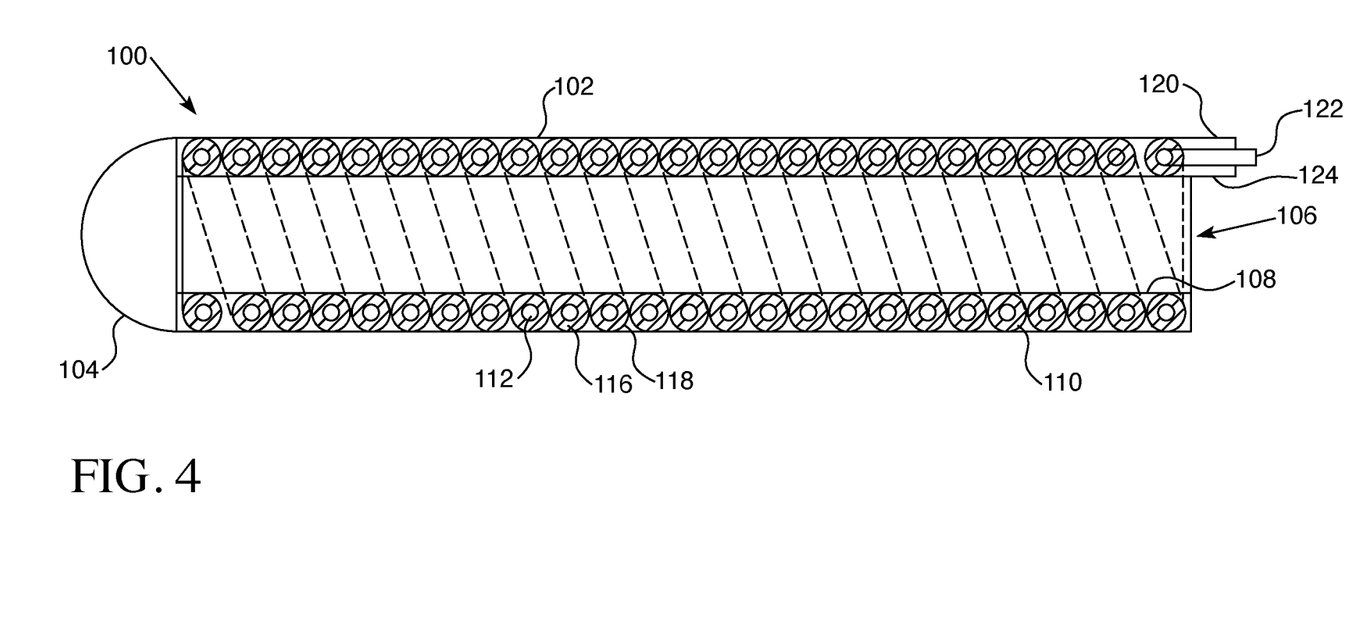
FIG. 4 is a schematic representation of an axial cross section of an insert thimble, in accordance with at least one non-limiting aspect of the present disclosure.

FIG. 4 depicts a schematic representation of an axial cross section of an insert thimble 100, in accordance with at least one non-limiting aspect of the present disclosure. In various examples, the insert thimble 100 includes an outer housing 102 having a closed end 104 and an open end 106, a hollow tube 108, a power generator 110 positioned between the hollow tube 108 and the outer housing 102, and a first electrical interface 120 electrically connected to the power generator 110. In some examples, the outer housing 102 can comprise a material having a low neutron cross section. In certain examples, the outer housing 102 can comprise Aluminum, Titanium, or a combination thereof.

The outer housing 102 is configured to be insertable into a fuel assembly. For example, the outer housing 102 can be configured with a cylindrical geometry. In the cylindrical configuration of the outer housing 102, the outer diameter of the outer housing 102 can be configured to be substantially the same as, or slightly smaller than, the inner diameter of a guide thimble of a fuel assembly. In one example, the outer diameter of the outer housing is configured to be about 10 millimeters. The length of the outer housing 102 can be configured to be substantially the same as, or shorter than, the length of a guide thimble of a fuel assembly. In one example, the length of the outer housing 102 is configured to be about 380 centimeters.

The hollow tube 108 is configured to be positioned within the outer housing 102. For example, the length of the hollow tube 108 is configured to be substantially the same as, or slightly shorter than, the length of the outer housing 102. In at least one example, the outer diameter of the hollow tube 108 is configured to be about from 3 millimeters to 6 millimeters smaller than the inner diameter of the outer housing 102.

The power generator 110 includes an electron emitter 112 and an electron collector 118. In various examples, the electron emitter 112 comprises a first material and a second material. In some examples, the power generator 110 comprises multiple layers. In the examples including multiple layers, the electron collector 118 is configured as a layer surrounding the electron emitter 112.

The composition of the power generator 110 is configurable to be responsive to incident gamma radiation. For example, the electron emitter 112 can comprise a metallic material having a high atomic number such as, for example, greater than 40. In some examples, the electron emitter 112 comprises platinum. The metallic material of the electron emitter 112 can interact with incident gamma radiation to produce electrons in the form of an emission of high energy electrons or delta radiation. Thus, an electron emitter incorporating this configuration can provide a source of electrons in response to fission events occurring within a spent fuel assembly.

The electron emitter 112 can also comprise a second material having a high neutron capture cross section. For example, the electron emitter 112 can comprise Gadolinium-157, Hafnium-177, or a combination thereof. In this configuration of the electron emitter 112, the second material can capture thermal neutrons and promptly thereafter, produce gamma radiation. Thus, an electron emitter 112 incorporating this configuration can supplement an incident gamma radiation received by the metallic material having a high atomic number, thereby supplementing the electron emission from the electron emitter 112.

The composition of the electron collector 118 can be configured to sink an electron emission. For example, the electron collector 118 can comprise a metallic material having a low atomic number, such as, for example, lower than 30. In one example, the electron collector 118 comprises Aluminum. An electron collector 118 comprising Aluminum can provide a sink for an electron emission. Thus, a voltage can develop between the electron emitter 112 and the electron collector 118 due to the emission of electrons in response to an incident neutron flux and/or gamma radiation.

The power generator 110 can be configured to surround the hollow tube 108. For example, the power generator 110 may be configured as a wire. In the wire configuration of the power generator 110, the power generator 110 can be tightly wrapped around the hollow tube 108 as shown in FIG. 3. The outer diameter of the wire is sized to be substantially the same as or slightly smaller than, the gap between the outer housing 102 and the hollow tube 108. In one example, the outer diameter of the wire is configured to be about 3 millimeters. The length of the wire can be sized to provide a substantially complete coverage of the hollow tube 108 upon wrapping the wire around the hollow tube 108. Additionally, the outer housing 102 can be swaged or compressed upon inserting the hollow tube 108 and the power generator 110 into the outer housing 102 to provide an optimal overall outer diameter of the insert thimble 100. Other configurations are contemplated by the present disclosure. For example, in some implementations, the power generator 110 can be configured as a sleeve, a rod, or a plate.

Figure 5:
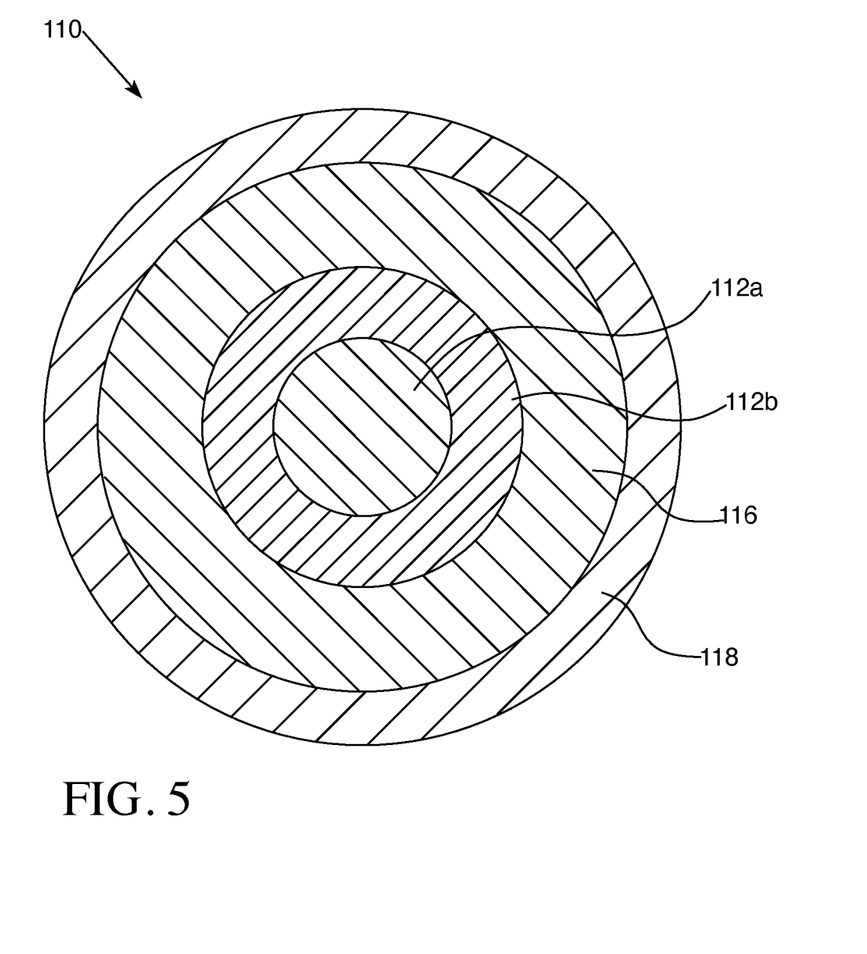
FIG. 5 is a schematic representation of a cross section of a power generator configured as a multilayer wire, in accordance with at least one non-limiting aspect of the present disclosure.

Now referring to FIGS. 4 and 5, the wire configuration of the power generator 110 can include multiple coaxial layers. For example, FIG. 5 depicts a schematic representation of a cross section of a power generator 110 configured as a multilayer wire, in accordance with at least one non-limiting aspect of the present disclosure. In the multilayer wire configuration of the power generator 110, the electron emitter 112 can be configured as an emitter core comprising a first layer 112a surrounded by a second layer 112b, the electron collector 118 can be configured as an outer sheath and an electrical insulation layer 116 can be positioned between the electron emitter 112 and the electron collector 118. The electrical insulation layer 116 can be configured to provide electrical insulation. For example, the electrical insulation layer 116 can comprise Magnesium Oxide, Aluminum Oxide, or a combination thereof. In some examples, the electron collector 118 can be compressed or swaged around the electrical insulation layer 116 to achieve a high, uniform, density within the electrical insulation. In certain examples where the power generator 110 configured as a multilayer wire, the multilayer wire is wrapped in a very tight spiral around the hollow tube 108 to maximize the amount of electron emitter 112 surface area per unit length of the hollow tube 108.

Now referring back to FIG. 4, the first electrical interface 120 can include a first electrical contact 122 and a second electrical contact 124. The first electrical contact 122 and/or the second electrical contact 124 can be configured as an electrical connector, an electrical lead, or a combination thereof. In some examples, the first electrical contact 122 and/or the second electrical contact 124 can be configured as a pin, a sleeve, a socket, a plug, a header, a terminal, an electrode, an integrated cable assembly, or a combination thereof. In certain examples, the first electrical contact 122 is surrounded by the second electrical contact 124. In one example, the first electrical contact 122 and the second electrical contact 124 are coaxially arranged as a pin surrounded by a sleeve shorter than the pin, so that the pin axially protrudes past the sleeve, as shown in FIG. 4.

In examples where the power generator 110 is configured as a multilayer wire, the first electrical contact 122 can be electrically connected to the second layer 112b of the emitter core and the second electrical contact 124 can be electrically connected to the electron collector 118. In some examples, the first electrical contact 122 is configured as a pin while the second electrical contact 124 is configured as a sleeve. In certain examples, the first electrical contact 122 axially protrudes past the second electrical contact. In one example, the first electrical contact 122 is configured as a tip and the second electrical contact 124 is configured as a sleeve coaxially positioned around the tip. As described hereinabove, a voltage can be formed between the electron emitter 112 and the electron collector 118 based on an incident neutron or gamma flux and therefore, the power generator 110 can provide an electrical current to a load connected to the first and second electrical contacts 122 and 124. Thus, a first electrical interface 120 incorporating this configuration is adapted to output an electrical power produced by the power generator 110.

Figure 6:
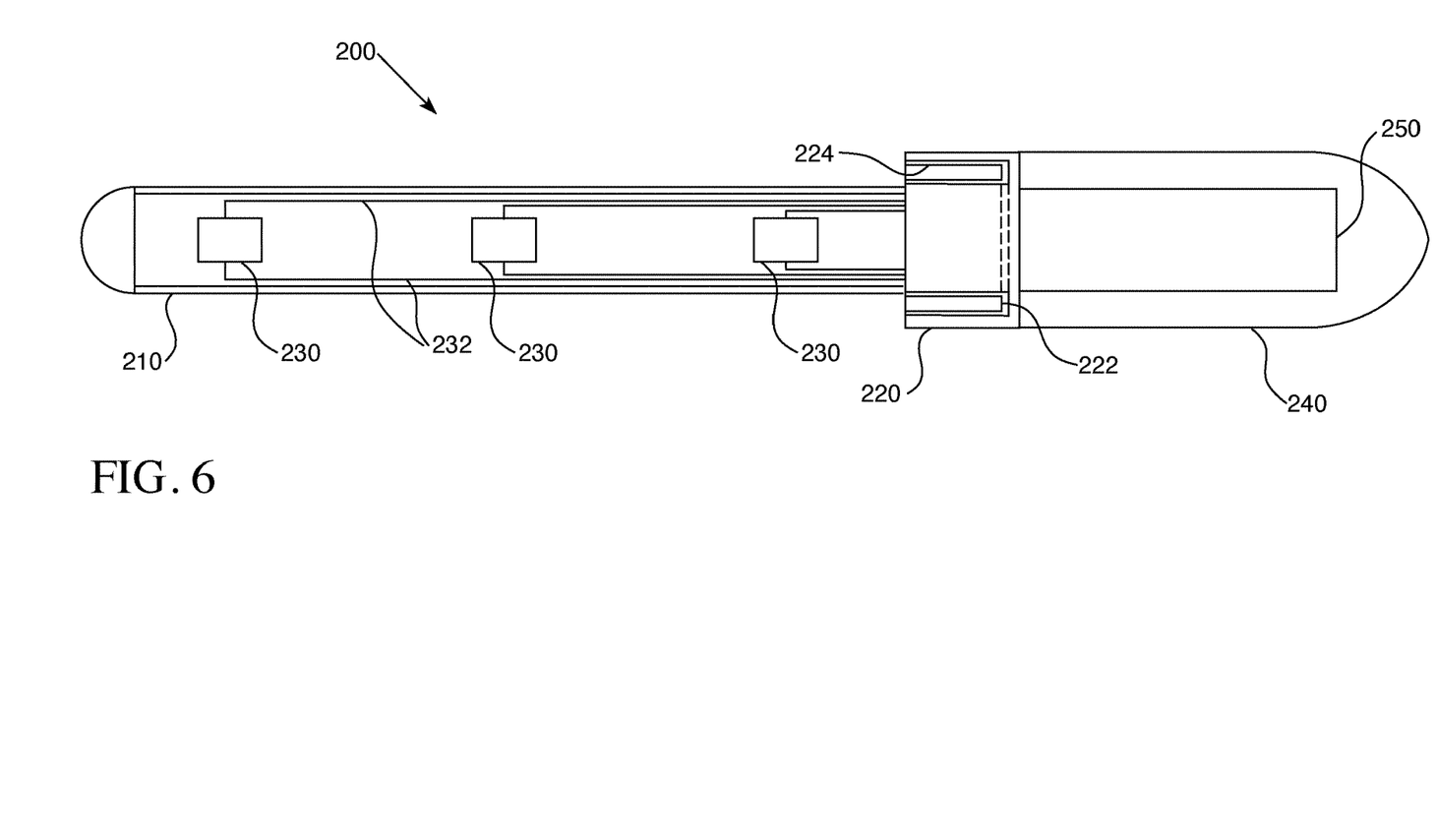
FIG. 6 is a schematic representation of an axial cross section of a detector assembly, in accordance with at least one non-limiting aspect of the present disclosure.

FIG. 6 depicts a schematic representation of an axial cross section of a detector assembly 200, in accordance with at least one non-limiting aspect of the present disclosure. In various examples, the detector assembly 200 includes a detector tube 210, a second electrical interface 220, and a transmitter section 240 containing a transmission circuit 250. The detector tube 210 is sized to be inserted into the hollow tube 108 and the second electrical interface 220 is positioned to abut the open end of the outer housing 102 upon fully inserting the detector tube 210. In some examples, the detector tube 210 is hermetically attached to the transmitter section 240.

The detector tube 210 is sized to fit within a hollow tube includes at least one solid state radiation detector 230. In some examples, the detector tube 210 can include a number of solid state radiation detectors 230. Although FIG. 6 depicts three solid state radiation detectors 230, any number of solid state radiation detectors 230 and/or any axial distribution thereof required to accurately monitor a length of a fuel assembly in a subcritical neutron generator may be employed and is only limited by the space available in the detector tube 210.

In various examples, the second electrical interface 220 includes a first electrical contact 222 and a second electrical contact 224, each of the electrical contacts 222 and 224 in electrical connection with the transmission circuit 250. The second electrical interface is configured to electrically couple to the first electrical interface 120. For example, the geometry of the first and second electrical contacts 222 and 224 can be configured to complement the electrical contacts 122 and 124, respectively. In some examples, the first electrical contact 222 and/or the second electrical contact 224 can be configured as a pin, a sleeve, a socket, a plug, a header, a terminal, an electrode, an integrated cable assembly, or a combination thereof. In one example, the first electrical contact 222 is incorporated into the inner axial face of an annular power input ring socket and the second electrical contact 224 is incorporated into the sidewalls of the annular power input ring socket as shown in FIG. 6. A second electrical interface 220 incorporating the annular power input ring configuration does not require any particular rotational alignment to provide an electrical connection, thereby facilitating assembly of the detector assembly 200 and insert thimble 100. Thus, a second electrical interface incorporating this configuration can receive an electrical power from the first electrical interface 120 upon a simple axial insertion of the detector assembly 200 into the insert thimble 100.

Now referring to FIG. 2, the second electrical interface 220 can be configured to receive electrical power from multiple sources simultaneously. For example, the detector assembly 200 can optionally include a third electrical interface 260. The third electrical interface 260 can include a first electrical contact 262 and a second electrical contact 264, both of which can be configured similarly to other electrical contacts described hereinabove. The first electrical contact 262 and the second electrical contact 264 can be electrically connected to the first electrical contact 242 and the second electrical contact 244, respectively, by a cable 266. The cable 266 can be configured as a coaxial cable or a triaxial cable. In the triaxial configuration of the cable 266, the cable 266 can include a layer of mineral insulation separating the middle conductive layer and the outer conducting sheath.

Now referring back to FIG. 6, the solid state radiation detector 230 is configured to output a detector signal directly proportional to an incident neutron flux level. For example, the solid state radiation detector 230 can include signal return leads attached thereto 232. In various examples, the detector signal is an analog signal. In some examples, the solid state radiation detector 230 can include a Silicon Carbide (hereinafter referred to as "SiC") based Schottky diode. SiC based Schottky diodes can promptly produce an electrical signal upon interacting with low level neutron flux and/or gamma radiation. Furthermore, the SiC based Schottky diode can be configured to be primarily neutron sensitive. For example, the SiC based Schottky diode can comprise a highly neutron reactive material, such as, for example, Boron, Lithium, or a combination thereof. In this configuration, the highly neutron reactive material can produce relatively high energy charged particle reaction products, thereby producing ionization in the SiC active volume. This allows the signal output from the SiC detector to be directly proportional to the neutron flux and provide statistically meaningful measurements at very low neutron flux levels, such as for example, a neutron flux level present in a subcritical neutron generator.

SiC based Schottky diodes can be manufactured as very small packages without compromising accuracy and/or precision of response. For example, SiC based Schottky diodes can be made into a device having a diameter of about 4 millimeters. Thus, the detector tube 210 can also be configured to fit into very small diameter opening, such as, for example, a 4.1 millimeter diameter opening. Accordingly, the size of the hollow tube 108 can be configured to accommodate a detector tube 210 incorporating a number of SiC based Schottky diodes without compromising the dimensions of the power generator or the ability to fit a wrapped detector tube into the outer housing 102.

Figure 7:
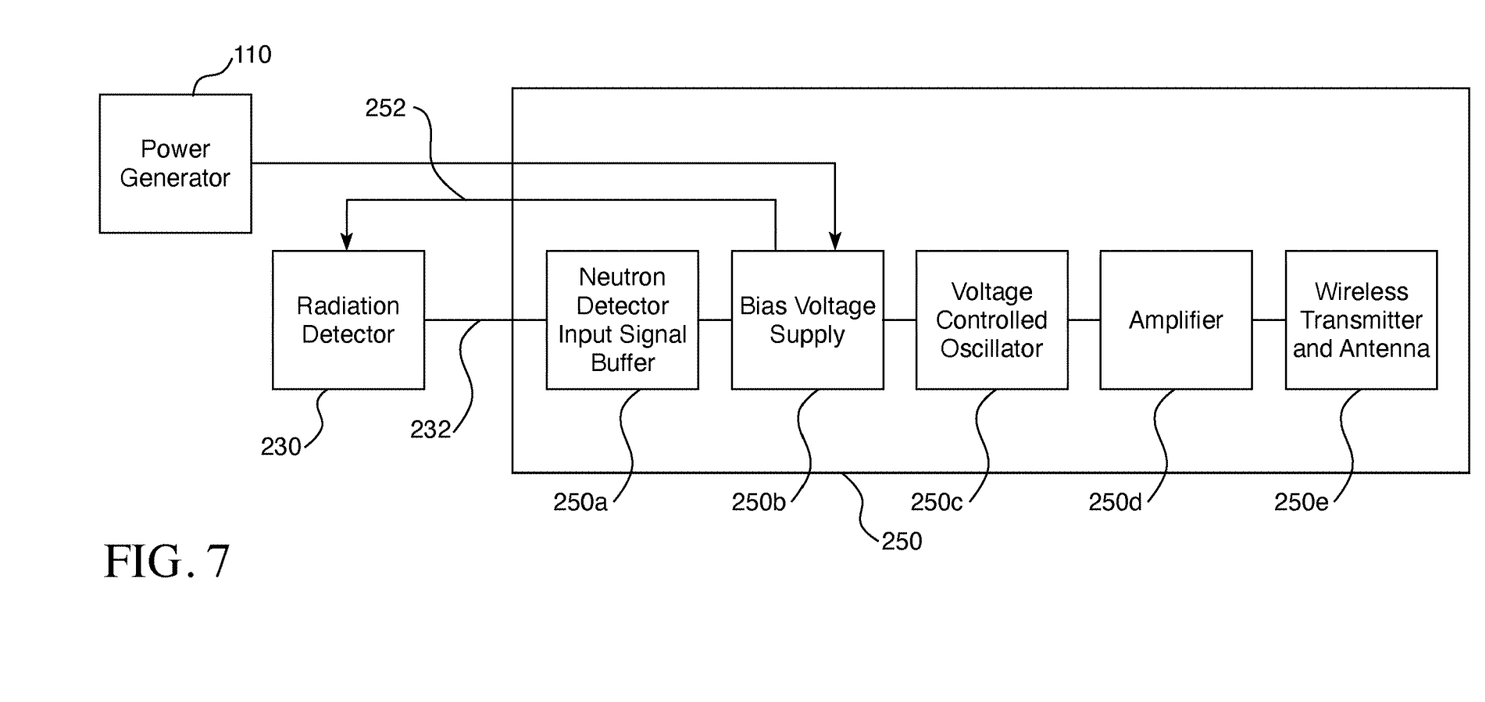
FIG. 7 is a schematic block diagram of a transmission circuit, in accordance with at least one non-limiting aspect of the present disclosure.

FIG. 7 depicts a schematic block diagram of a transmission circuit 250 for a transmitter section 240, in accordance with at least one non-limiting aspect of the present disclosure. The transmission circuit 250 can include a neutron detector input signal buffer 250*a*, a bias voltage supply 250*b*, a voltage controlled oscillator 250*c*, an amplifier 250*d*, and an output 250*e* comprising a wireless transmitter and antenna. In various examples, the bias voltage supply of the transmission circuit 250 is electrically connected to the first and second electrical contacts 222 and 224 of the second electrical interface 220. In some examples, the neutron detector input signal buffer 250*a* of the transmission circuit 250 is connected to a SiC based Schottky diode via a pair of signal return leads 232. In certain examples, the neutron detector input signal buffer 250*a* includes multiple input sections, and is connected to a number of SiC based Schottky diodes. In one example, the bias voltage supply 250*b* of the transmission circuit 250 can optionally be connected to a solid state radiation detector via a separate bias voltage lead 252 as shown in FIG. 7. In this example, a negative bias voltage of up to 100 Volts can be applied to provide a desired signal response in a specific radiation field.

The signal provided by the solid state radiation detector 230 can be processed and wirelessly transmitted with hardware suitable for use in nuclear reactor environments. For example, vacuum microelectronic (hereinafter referred to as "VME") transmitter technology can be used as described in the article entitled "Toward the implementation of self-powered, wireless, real-time reactor power sensing," which was published in Volume 139 of the journal entitled "Annals of Nuclear Energy" on Dec. 24, 2019, and which is incorporated by reference herein in its entirety. In some examples, the transmission circuit 250 can transmit a continuous radio frequency signal representative of the signal outputted by the solid state radiation detector 230. In certain examples, the transmission circuit 250 can transmit a signal having a frequency in the megahertz range. In one example, the transmission circuit 250 can include a multiplexer for transmitting multiple signals from a number of radiation detectors simultaneously.

Now referring back to FIG. 2, an auxiliary power system 24 can be optionally connected to a self-powered sensor insert 22. The auxiliary power system 24 includes an auxiliary insert thimble 400 and an auxiliary power cap 500. The auxiliary insert thimble 400 is similar in many respects to other insert thimbles as disclosed elsewhere in the present disclosure, which are not repeated herein at the same level of detail for brevity. In various examples, the auxiliary insert thimble 400 can include an outer housing, a power generator and a first auxiliary electrical interface, and can be configured similarly to an insert thimble 100 as described hereinabove. Thus, the auxiliary insert thimble 400 can be configured to be insertable into a fuel assembly and output an electrical power through the first auxiliary electrical interface upon interacting with an incident neutron or gamma flux.

The auxiliary power cap 500 includes a second auxiliary electrical interface 510 and a third auxiliary electrical interface 520. The second auxiliary electrical interface 510 and the third auxiliary electrical interface 520 can be configured similarly to the second electrical interface 220 and the third electrical interface 260, respectively. Thus, second auxiliary electrical interface 510 can be configured to receive an auxiliary electrical power from the first auxiliary electrical interface of the auxiliary insert thimble 400 and the third auxiliary electrical interface 520 can be configured as a peripheral electrical connector 522 electrically connected with a triaxial cable 524 in parallel with the second auxiliary electrical interface 510. The peripheral electrical connector 522 can be configured as a plug, a socket, or a combination thereof. A peripheral electrical connector 522 incorporating both a plug and a socket can provide an electrical connection between the second auxiliary electrical interface 510 and a third electrical interface 260, a separate peripheral electrical connector 700 and/or a terminating cap 800 as depicted in FIG. 2. Thus, an auxiliary power cap 500 can be configured to supplement the electrical power provided by the insert thimble 100 to the transmission circuit 250 in conjunction with other auxiliary power inserts. Accordingly, the power sensor system 20 can maintain an electrical power provided to the transmission circuit 250 in very low flux conditions to provide the benefit of very low neutron flux measurements without requiring an external power supply.

In certain examples, the auxiliary insert thimble 400 and the auxiliary power cap 500 can be joined with a coupler 600, which can be configured similarly to a coupler 300 as described hereinabove. Thus, the coupler 600 can be configured to provide a liquid tight seal around a mating interface between the auxiliary insert thimble 400 and the auxiliary power cap 500.

An auxiliary power system 24 is not limited to powering a self-powered sensor insert 22. For example, any device including an electrical interface configured similarly to a second electrical interface 220 can be coupled to one or more auxiliary power systems 24, and therefore can be powered by the one or more auxiliary power systems 24 upon being inserted into a spent fuel assembly. Thus, one or more auxiliary power systems 24 can be incorporated into a spent fuel assembly in a spent fuel pool or dry storage cask with or without a self-powered sensor insert 22 to harvest radiation and produce electrical power.

Figure 8:
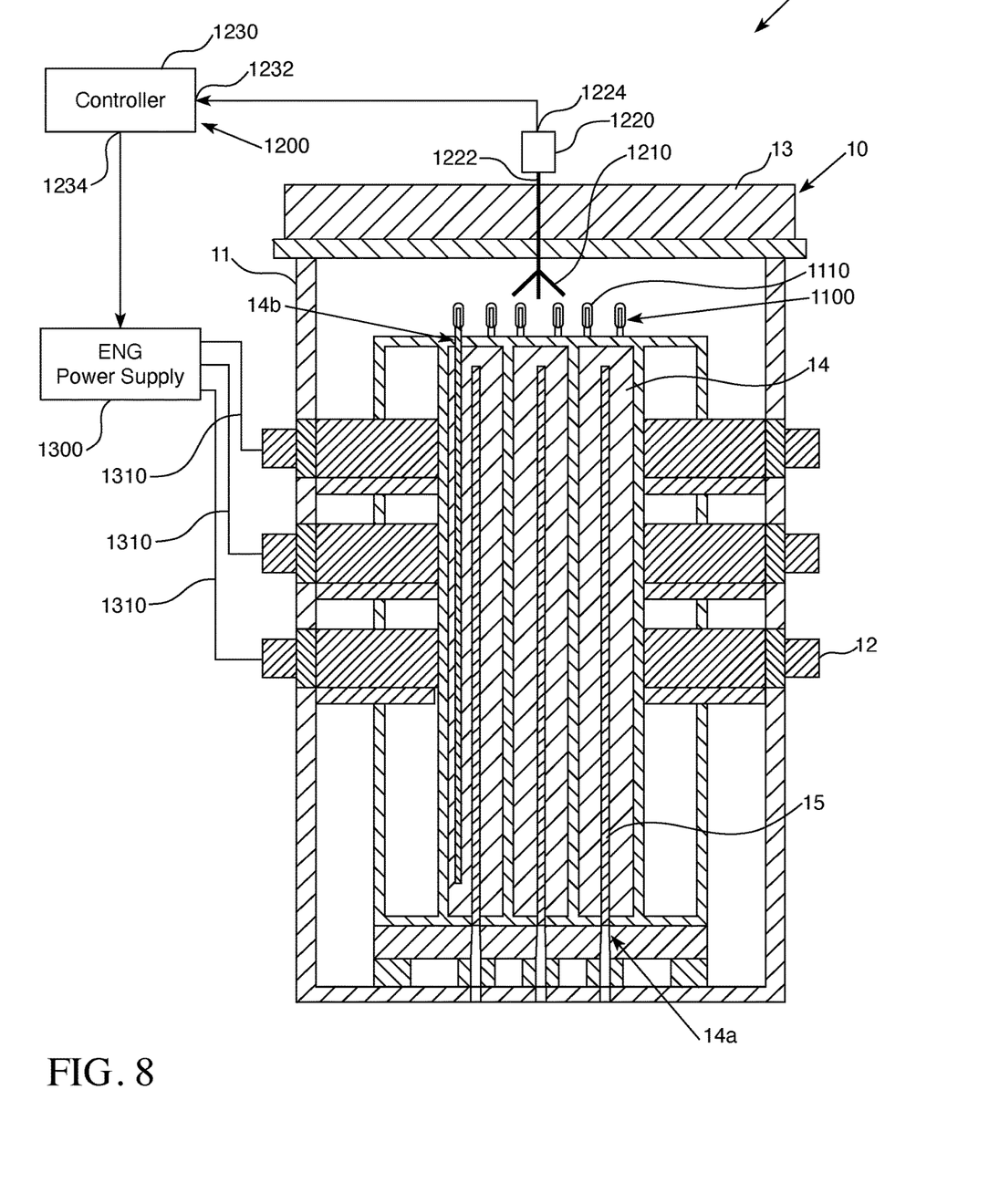
FIG. 8 is schematic representation of a power monitor system for a subcritical neutron generator, in accordance with at least one non-limiting aspect of the present disclosure.

FIG. 8 depicts a schematic representation of a power monitor system 1000, in accordance with at least one non-limiting aspect of the present disclosure. The power monitor system includes at least one power sensor system 1100 and a control system 1200. Each of the at least one power sensor systems 1100 includes a self-powered sensor insert 1110, and is similar in many respects to other power sensor systems disclosed elsewhere in in the present disclosure, which are not repeated herein at the same level of detail for brevity. In various examples, the self-powered sensor insert 1110 includes an insert thimble and a detector assembly. The insert thimble includes a housing, first power generator comprising a material having a high neutron capture cross section, and a first electrical interface, and can be configured similarly to other insert thimbles described elsewhere in the present disclosure. Thus, the insert thimble can be configured to fit within a guide thimble of a spent fuel assembly, the first power generator can be configured to produce a first electrical power based on delta-radiation and the first electrical interface can be configured to output the first electrical power.

The detector assembly includes a detector tube, at least one radiation detector comprising a Silicon Carbide based Schottky diode enclosed in a detector tube, a transmission circuit comprising a transmitter, and a second electrical interface. In some examples, the detector assembly can include a third electrical interface. The detector assembly can be configured similarly to other detector assemblies described hereinabove. Thus, the detector tube can be configured to be surrounded by the first power generator, the at least one radiation detector can be adapted to provide a first signal in response to an incident neutron flux, the transmission circuit can be configured to output a wireless signal based on the first signal from the at least one radiation detector, and the second electrical interface can be adapted to receive the first electrical power from the first electrical interface of the insert thimble and to provide a power source for the transmission circuit. In some examples, the third electrical interface can be configured to receive an auxiliary electrical power in parallel with the first electrical power.

In some examples, each of the at least one power sensor systems 1100 can include at least one auxiliary power system. Each of the at least one auxiliary power systems can include an auxiliary insert thimble and an auxiliary power cap, and can be configured similarly to other auxiliary power systems described hereinabove. Thus, each of the at least one auxiliary power system can be configured to provide at least a portion of an auxiliary electrical power to the second electrical interface through a third electrical interface.

The control system 1200 includes an antenna 1210 for receiving a wireless signal, a signal interface 1220, and a controller 1230 comprising a processor. The antenna 1210 can be configured as a directional antenna or an omnidirectional antenna. In various examples, the antenna 1210 is electrically connected to a signal interface 1220 either directly or with a suitable shielded cable.

In various examples, the signal interface 1220 includes an input section 1222 and an output section 1224. The input section 1222 can be configured to accept a wireless signal from the antenna 1210. For example, the input section 1222 can be configured as a wireless receiver circuit. In certain examples, the input section 1222 includes a demodulator for extracting information from a carrier wave. In one example, the input section 1222 is a demodulator for radio frequency signals. The output section 1224 can be configured as a wireless transmitter or a wired output.

The signal interface 1220 can also include an Analog/Digital Converter (hereinafter referred to as "ADC"). A signal interface 1220 incorporating an ADC can convert a signal from the input section 1222 into a digital representation proportional to the input signal. In some examples, the output section 1224 is connected to the digital output of an ADC. Thus, a signal interface 1220 incorporating this configuration can convert an analog signal into a digital representation and output a signal suitable for subsequent signal processing.

In various examples, the controller 1230 can include a controller input 1232 and a controller output 1234. The controller input 1232 can be configured to be electrically or wirelessly connected to the output section 1224 of the signal interface 1220. For example, the controller input 1232 can include a digital input section. In some examples, the controller input 1232 can include a wired port and/or a wireless receiver. Thus, the controller input 1232 can be configured to receive a signal from the signal interface 1220.

In various examples, the processor includes an input in electrical communication with the controller input 1232 and an output in electrical communication with the controller output 1234. In some examples, the controller 1230 can include a level shifter electrically connected between an input of the processor and the controller input 1232 and/or between an output of the processor and the controller output 1234. In certain examples, the controller output 1234 can include a Digital/Analog Converter (hereinafter referred to as "DAC").

The processor of the controller 1230 can be configured as a general processor, a microprocessor, a microcontroller, an embedded processor, a digital signal processor, a field programmable gate array, an application specific system processor, an application specific instruction set processor, an application specific integrated circuit, or a combination thereof. The processor can be configured to process a digital signal produced by the signal interface 1220. For example, a processor configured as a digital signal processor can analyze and manipulate data provided by the signal interface 1220 in real-time. Thus a processor incorporating this configuration can determine whether an incident flux around a radiation detector of a self-powered sensor insert 1110 is within a predetermined allowable operating limit based on a real time analysis of a digital representation of the signal provided by the radiation detector. The processor can subsequently output an instruction or a control signal based on the analyzed signal to control a neutron flux provided by an ENG. For example, the controller output 1234 can be connected to a controllable ENG power supply 1300 powering an ENG 12 through an ENG power supply cable 1310 in a subcritical neutron generator 10 to continuously provide a control signal for changing the power supply duty cycle and/or power level fed to an ENG 12, thereby manipulating any fission events in a spent fuel assembly relying on the source neutron flux produced by the ENG. Thus, a controller 1230 incorporating this configuration can continuously and accurately monitor and control the neutron flux surrounding a self-powered sensor insert 1110 in real time.

Now referring to FIGS. 1 and 8, the power monitor system 1000 can be incorporated into a subcritical neutron generator 10 adapted to house the power monitor system 1000. For example, a power sensor system 1100 can be positioned in the top accessible guide thimbles 14*b* of an array of spent fuel assemblies 14. In various examples, a removable lid 13 of a containment vessel 11 can be configured with an opening substantially the same as, or slightly larger than, a body of an antenna 1210 to accommodate an antenna 1210 as shown in FIG. 8, so that at least a portion of the antenna 1210 is positioned within the containment vessel 11 when the removable lid 13 is installed. In one example, the antenna 1210 can be inserted through the removable lid with an interference fit. The second end of the antenna 1210 may be connected to the input of a signal interface 1220 positioned outside of the containment vessel 11, either directly or with a shielded cable. An antenna 1210 incorporating this configuration can wirelessly receive a second signal based on a first signal provided by a radiation detector and outputted by the transmitter of the self-powered sensor insert 1110, thereby avoiding any interruptions in flux measurements when the removable lid 13 is removed from the containment vessel 11. Accordingly, spent fuel assemblies 14 can be loaded into the containment vessel 11 and an activity level $K_{eff}$ of the spent fuel assemblies 14 based on the neutron population surrounding the spent fuel assemblies can be monitored continuously during the initial loading stage without repeatedly opening and closing the containment vessel.

As described herein, the subcritical neutron generator 10 incorporating a power monitor system 1000 can be incorporated into an optimization method. For example, a method for optimizing a subcritical neutron generator 10 can include preparing the subcritical neutron generator 10 and loading the subcritical neutron generator 10. In various examples, preparing the subcritical neutron generator 10 includes opening a top of a containment vessel of the subcritical neutron generator; and inserting a self-powered sensor insert of a power monitor system into at least one spent fuel assembly. In various examples, loading the subcritical neutron generator can include individually inserting the at least one spent fuel assembly into the open top of the containment vessel; continuously monitoring a signal produced by the self-powered sensor insert to evaluate a neutron reproduction factor within the open containment vessel during the loading; and replacing the top of the containment vessel after loading the last at least one spent fuel assembly.

In some examples, the method for optimizing a subcritical neutron generator 10 can include irradiating the at least one spent fuel assembly, wherein the irradiating comprises monitoring the signal produced by the self-powered sensor insert with a control system of the power monitor system to track a neutron population distribution within the at least one spent fuel assembly; and providing at least one source neutron flux with at least one electronic neutron generator of the subcritical neutron generator. In certain examples, the providing step of the irradiating can include powering at least one electronic neutron generator of the subcritical neutron generator with a power supply to generate the at least one source neutron flux, wherein the at least one source neutron flux subsequently irradiates the at least one spent fuel assembly to produce a subcritical neutron population within the at least one spent fuel assembly; and controlling the power supply with a controller of the control system to optimize a distribution of the subcritical neutron population during the irradiation, wherein the controlling is based in part on the monitored signal produced by the self-powered sensor insert.

In the event that a subcritical neutron generator must be loaded or reloaded with spent fuel assemblies of varying individual neutron reproduction factors, the use of a power monitor system in a method for optimizing a subcritical neutron generator as disclosed hereinabove can provide prompt and reliable verification of the overall neutron reproduction factor $K_{eff}$ of the array of spent fuel assemblies after each insertion of an individual spent fuel assembly without requiring closing the containment vessel 11, thereby avoiding any economic issues associated with repeated removal and replacement of a lid during an initial loading of the containment vessel. Additionally, if the controller determines a neutron population distribution within a spent fuel assembly is inadequate for producing a medical radioisotope, the use of a power monitor system in a method for optimizing a subcritical neutron generator as disclosed hereinabove can prompt an ENG power supply to increase its power output and/or duty cycle. Conversely, in the event that a measurement exceeds a predetermined allowable safety limit, the control system may prompt a shutdown of an ENG power supply and/or an emergency injection of a boric acid based fluid via a coolant circulation system attached to the containment vessel. Thus, the method for optimizing a subcritical neutron generator as disclosed hereinabove can promptly and continuously optimize a radiant flux produced by an array of spent fuel assemblies delivered to irradiation target inserts positioned therein to predictably produce synthetic radioisotopes at the commercial scale without sacrificing operation safety.

Various aspects of the invention according to the present disclosure include, but are not limited to, the aspects listed in the following numbered clauses.

Clause 1—A power sensor system for monitoring a subcritical neutron generator, wherein the power sensor system comprises a self-powered sensor insert for measuring neutron flux levels in a spent fuel assembly of the subcritical neutron generator. The self-powered sensor insert comprises an insert thimble and a detector assembly. The insert thimble further comprises an outer housing comprising a closed end, wherein the outer housing is insertable into a guide thimble of a spent fuel assembly; a hollow tube positioned within the outer housing; a power generator positioned between the hollow tube and the outer housing, the power generator comprising an electron emitter and an electron collector, wherein the electron emitter comprises a first material and a second material, wherein the electron emitter is configured to be responsive to an incident radiation produced by the spent fuel assembly, and wherein the power generator is configured to produce an electrical power based on the incident radiation; and a first electrical interface electrically connected to the power generator. The detector assembly further comprises a detector tube sized to fit into the hollow tube of the insert thimble, a transmitter section comprising a transmission circuit, and a second electrical interface configured to electrically couple to the first electrical interface. The detector tube comprising a solid state radiation detector. The solid state radiation detector provides a detector signal directly proportional to a neutron flux level. Additionally, the transmitter section is configured to wirelessly output a transmitter signal based on the detector signal and the second electrical interface is electrically connected to the transmission circuit.

Clause 2—The power sensor system of clause 1, wherein the power generator comprises a multilayer wire. The multilayer wire comprises an emitter core comprising a first layer and a second layer, an electrical insulation layer surrounding the emitter core, and a collector sheath surrounding the electrical insulation layer. The emitter core is configured to produce an electron emission in response to the incident radiation and the collector sheath is configured to sink the electron emission.

Clause 3—The power sensor system of clause 2, wherein the first layer of the multilayer wire comprises a material having a high neutron capture cross section and wherein the second layer of the multilayer wire comprises a metallic material having a high atomic number.

Clause 4—The power sensor system of clause 3, wherein the first layer of the multilayer wire comprises Gadolinium-157, Hafnium-177, or a combination thereof.

Clause 5—The power sensor system of any one of clauses 2-4, wherein the collector sheath comprises a metallic material having a low atomic number.

Clause 6—The power sensor system of any one of clauses 2-5, wherein the electrical insulation layer comprises Magnesium oxide.

Clause 7—The power sensor system of any one of clauses 2-6, wherein the multilayer wire is helically wrapped around the hollow tube.

Clause 8—The power sensor system of any one of clauses 2-7, wherein the first electrical contact of the first electrical interface is electrically connected to the emitter core, and wherein the second electrical contact of the first electrical interface is electrically connected to the collector sheath.

Clause 9—The power sensor system of any one of clauses 1-8, wherein the solid state radiation detector comprises a Silicon Carbide based Schottky diode.

Clause 10—The power sensor system of clause 9, wherein the Schottky diode is configured to be primarily neutron sensitive.

Clause 11—The power sensor system of any one of clauses 9-10, wherein the Schottky diode comprises Boron, Lithium, or a combination thereof.

Clause 12—The power sensor system of any one of clauses 1-11, wherein the detector tube comprises a number of radiation detectors, wherein the transmitter signal is based on a detector signal provided by each of the radiation detectors.

Clause 13—The power sensor system of any one of clauses 1-12, wherein the power sensor system comprises a coupler adapted to provide a watertight coupling between the insert thimble and the detector assembly.

Clause 14—The power sensor system of any one of clauses 1-13, wherein the power sensor system comprises an auxiliary power system, the auxiliary power system comprising an auxiliary power insert and an auxiliary power output cap, wherein the auxiliary power insert is configured to produce an auxiliary electrical power based on the incident radiation, wherein the power output cap is electrically connected to the auxiliary power insert and the second electrical interface, wherein the power output cap is electrically connected in parallel with the power generator.

Clause 15—A power monitor system for controlling a subcritical neutron generator. The power monitor system comprises a power sensor system for monitoring a subcritical neutron generator and a control system. The power sensor system comprises a self-powered sensor insert for measuring neutron flux levels in a spent fuel assembly of the subcritical neutron generator. The self-powered sensor insert comprises an insert thimble and a detector assembly. The insert thimble comprises a housing, a first power generator for producing a first electrical power based on delta-radiation, and a first electrical interface configured to output the first electrical power. The first power generator comprises a material having a high neutron capture cross section. The detector assembly comprises a detector tube configured to be surrounded by the first power generator, at least one radiation detector comprising a Silicon Carbide based Schottky diode, a transmission circuit comprising a transmitter for outputting a wireless signal based on the first signal, and a second electrical interface adapted to receive the first electrical power. The at least one radiation detector is enclosed in the detector tube, and is adapted to provide a first signal in response to an incident neutron flux. The second electrical interface provides a power source for the transmission circuit. The control system comprises an antenna for receiving the wireless signal; a signal interface, wherein an input of the signal interface is electrically connected to the antenna, wherein the signal interface is configured to output a third signal based on the wireless signal; and a controller comprising a processor. The controller is configured to receive the third signal and based on the third signal, control a neutron flux outputted by an electronic neutron generator of the subcritical neutron generator.

Clause 16—The power monitor system of clause 15, wherein the detector assembly comprises a third electrical interface adapted to receive an auxiliary power in parallel with the first electrical power.

Clause 17—The power monitor system of clause 16, wherein the power monitor system comprises at least one auxiliary thimble, wherein the at least one auxiliary thimble comprises an auxiliary power generator configured to produce at least a portion of the auxiliary power.

Clause 18—A subcritical neutron generator comprising a power monitor system of any one of clauses 15-17, wherein a removable lid of the subcritical neutron generator comprises an opening configured to hold a portion of the antenna of the control system, wherein a portion of the antenna is positioned within a containment vessel of the subcritical neutron generator upon installing the removable lid onto the containment vessel, and wherein the signal interface is positioned outside of the containment vessel.

Clause 19—A method for optimizing a subcritical neutron generator, wherein the method comprises preparing the subcritical neutron generator and loading the subcritical neutron generator. Preparing the subcritical neutron generator comprises opening a top of a containment vessel of the subcritical neutron generator and inserting a self-powered sensor insert of a power monitor system into at least one spent fuel assembly. Loading the subcritical neutron generator comprises individually inserting the at least one spent fuel assembly into the open top of the containment vessel; continuously monitoring a signal produced by the self-powered sensor insert to evaluate a neutron reproduction factor within the open containment vessel during the loading; and replacing the top of the containment vessel after loading the last at least one spent fuel assembly.

Clause 20—The method of clause 19, wherein the method further comprises irradiating the at least one spent fuel assembly. Irradiating the at least one spent fuel assembly comprises monitoring the signal produced by the self-powered sensor insert with a control system of the power monitor system to track a neutron population distribution within the at least one spent fuel assembly; and providing at least one source neutron flux with at least one electronic neutron generator of the subcritical neutron generator. Providing at least one source neutron flux with at least one electronic neutron generator of the subcritical neutron generator comprises powering at least one electronic neutron generator of the subcritical neutron generator with a power supply to generate the at least one source neutron flux, wherein the at least one source neutron flux subsequently irradiates the at least one spent fuel assembly to produce a subcritical neutron population within the at least one spent fuel assembly; and controlling the power supply with a controller of the control system to optimize a distribution of the subcritical neutron population during the irradiation, wherein the controlling is based on the monitored signal produced by the self-powered sensor insert.

Various features and characteristics are described in this specification to provide an understanding of the composition, structure, production, function, and/or operation of the invention, which includes the disclosed methods and systems. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a method or system that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

As used in this specification, particularly in connection with layers, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a layer "applied over" a substrate does not preclude the presence of another layer or other layers of the same or different composition located between the applied layer and the substrate. Likewise, a second layer "applied over" a first layer does not preclude the presence of another layer or other layers of the same or different composition located between the applied second layer and the applied first layer.

Whereas particular examples of this invention have been described above for purposes of illustration, it will be evident to those skilled in the art that numerous variations of the details of the present invention may be made without departing from the invention as defined in the appended claims.

What is claimed is:

1. A power sensor system for monitoring a subcritical neutron generator, the power sensor system comprising:
   a self-powered sensor insert for measuring neutron flux levels in a spent fuel assembly of the subcritical neutron generator, the self-powered sensor insert comprising:
      an insert thimble comprising:
         an outer housing comprising a closed end, wherein the outer housing is insertable into a guide thimble of a spent fuel assembly;
         a hollow tube positioned within the outer housing;
         a power generator positioned between the hollow tube and the outer housing, the power generator comprising an electron emitter and an electron collector, wherein the electron emitter comprises a first material and a second material, wherein the electron emitter is configured to be responsive to an incident radiation produced by the spent fuel assembly, and wherein the power generator is configured to produce an electrical power based on the incident radiation; and
         a first electrical interface electrically connected to the power generator; and
      a detector assembly, comprising:
         a detector tube sized to fit into the hollow tube of the insert thimble, the detector tube comprising a solid state radiation detector, wherein the solid state radiation detector provides a detector signal directly proportional to a neutron flux level;
         a transmitter section comprising a transmission circuit, wherein the transmitter section is configured to wirelessly output a transmitter signal based on the detector signal; and
         a second electrical interface configured to electrically couple to the first electrical interface, wherein the second electrical interface is electrically connected to the transmission circuit.

2. The power sensor system as claimed in claim 1, wherein the power generator comprises a multilayer wire, the multilayer wire comprising:
   an emitter core comprising a first layer and a second layer, wherein the emitter core is configured to produce an electron emission in response to the incident radiation;
   an electrical insulation layer, wherein the electrical insulation surrounds the emitter core; and
   a collector sheath surrounding the electrical insulation layer, wherein the collector sheath is configured to sink the electron emission.

3. The power sensor system as claimed in claim 2, wherein the first layer comprises a material having a high neutron capture cross section and wherein the second layer comprises a metallic material having a high atomic number.

4. The power sensor system as claimed in claim 3, wherein the first layer comprises Gadolinium-157, Hafnium-177, or a combination thereof.

5. The power sensor system as claimed in claim 2, wherein the collector sheath comprises a metallic material having a low atomic number.

6. The power sensor system as claimed in claim 2, wherein the electrical insulation layer comprises Magnesium oxide.

7. The power sensor system as claimed in claim 2, wherein the multilayer wire is helically wrapped around the hollow tube.

8. The power sensor system as claimed in claim 2, wherein the first electrical contact of the first electrical interface is electrically connected to the emitter core, and wherein the second electrical contact of the first electrical interface is electrically connected to the collector sheath.

9. The power sensor system as claimed in claim 1, wherein the solid state radiation detector comprises a Silicon Carbide based Schottky diode.

10. The power sensor system as claimed in claim 9, wherein the Schottky diode is configured to be primarily neutron sensitive.

11. The power sensor system as claimed in claim 10, wherein the Schottky diode comprises Boron, Lithium, or a combination thereof.

12. The power sensor system as claimed in claim 1, wherein the detector tube comprises a number of radiation detectors, wherein the transmitter signal is based on a detector signal provided by each of the radiation detectors.

13. The power sensor system as claimed in claim 1, wherein the power sensor system comprises a coupler adapted to provide a watertight coupling between the insert thimble and the detector assembly.

14. The power sensor system as claimed in claim 1, wherein the power sensor system comprises an auxiliary power system, the auxiliary power system comprising an auxiliary power insert and an auxiliary power output cap, wherein the auxiliary power insert is configured to produce an auxiliary electrical power based on the incident radiation, wherein the power output cap is electrically connected to the auxiliary power insert and the second electrical interface, wherein the power output cap is electrically connected in parallel with the power generator.

\* \* \* \* \*